United States Patent
Gram-Hansen et al.

(10) Patent No.: US 8,538,729 B2
(45) Date of Patent: Sep. 17, 2013

(54) METHOD AND SYSTEM OF WIND TURBINE CONDITION MONITORING

(75) Inventors: Klaus Gram-Hansen, Haderslev (DK); Axel Juhl, Haderslev (DK); Troels Kildemoes Moeller, Hurup Thy (DK)

(73) Assignees: Siemens Aktiengesellschaft, München (DE); Gram & Juhl A/S, Vogens (DK)

( * ) Notice: Subject to any disclaimer, the term of this patent is extended or adjusted under 35 U.S.C. 154(b) by 306 days.

(21) Appl. No.: 12/571,773

(22) Filed: Oct. 1, 2009

(65) Prior Publication Data
US 2010/0082295 A1    Apr. 1, 2010

(30) Foreign Application Priority Data
Oct. 1, 2008    (EP) .................................... 08017322

(51) Int. Cl.
G06F 11/30    (2006.01)
G21C 17/00    (2006.01)

(52) U.S. Cl.
USPC ...................................................... 702/182

(58) Field of Classification Search
USPC ...................................................... 702/182
See application file for complete search history.

(56) References Cited

U.S. PATENT DOCUMENTS

| | | | |
|---|---|---|---|
| 6,320,272 B1 * | 11/2001 | Lading et al. .................. 290/44 | |
| 6,400,148 B1 | 6/2002 | Meyer et al. | |
| 6,435,013 B1 * | 8/2002 | Rodriguez et al. ........... 73/61.75 | |
| 6,928,370 B2 | 8/2005 | Anuzis et al. | |
| 2003/0200014 A1 | 10/2003 | Remboski et al. | |
| 2004/0006398 A1 * | 1/2004 | Bickford .......................... 700/30 | |
| 2007/0140847 A1 | 6/2007 | Martinez De Lizarduy Romo et al. | |
| 2009/0169379 A1 * | 7/2009 | McClintic ....................... 416/31 | |

FOREIGN PATENT DOCUMENTS

| | | |
|---|---|---|
| CN | 1882892 A | 12/2006 |
| EP | 1 531 376 B1 | 1/2007 |
| JP | 2008116289 A | 5/2008 |
| WO | WO 03089996 A2 | 10/2003 |

OTHER PUBLICATIONS

Timothy J. Clark, Ricahrd F. Bauer and James R. Rasmussen, "Wind Power Comes of Age", New Product, GE Energy; Orbit 2Q04, 2004, pp. 21-27.

* cited by examiner

*Primary Examiner* — Alexander H Taningco
*Assistant Examiner* — Manuel Rivera Vargas

(57) ABSTRACT

The invention relates to a method of condition monitoring of a wind turbine. Measurement data and operating condition parameters are captured. A subset of the operating condition parameters is selected. A set of n characterizing moments is calculated based on the subset of operating condition parameters. A finite n-dimensional space each representing possible values for one of the characterising moments is provided. The n-dimensional space is sub-divided into a number of bins each representing a n-dimensional interval defined by n one-dimensional intervals. Each one- dimensional intervals represents an interval in one of the n dimensions. Each bin defines an acceptable range for the set of n characterizing moments. The set of the characterising moments is determined if it belongs to one of the bins. The set of the characterising moments and measurement data are accepted if the set of the characterising moments belongs to one of the bins.

16 Claims, 3 Drawing Sheets

METHOD AND SYSTEM OF WIND TURBINE CONDITION MONITORING

CROSS REFERENCE TO RELATED APPLICATIONS

This application claims priority of European application No. 08017322.2 filed Oct. 1, 2008, which is incorporated by reference herein in its entirety.

FIELD OF THE INVENTION

This invention relates to a method of condition monitoring of a wind turbine, and a wind turbine condition monitoring system therefore.

BACKGROUND OF THE INVENTION

In order to detect irregularities during the operation of a wind turbine and to trigger an alarm condition based upon the detected irregularity, wind turbine monitoring systems of the state of the art obtain measurement values of various kinds and evaluate the values thus obtained to determine if a predefined alarm condition is satisfied.

The system proposed in European patent specification EP 1 531 376 B1 begins to capture input measurement values whenever predetermined operation variables of the wind turbine are within a certain predetermined operation range, said operation variables being received from the control system of the wind turbine. Such taking of data upon occurrence of predetermined conditions is often described as triggered capturing or triggered measurements.

However, as data capturing commences after a pre-specified triggering condition has been met, the capturing of data may suffer from the incoming data becoming unstable during the intended capturing time. Such instability of the captured values may involve sudden changes of the operating parameters of the wind turbine. The system proposed in the aforementioned European patent specification detects if any of the measured operation variables varies during the entire signal capturing beyond a predefined upper or lower limit, and, if so, aborts the capturing and discards the captured data. A consequence of this is that the capturing procedure must be started again as soon as the triggering condition is met again and further that valuable information is lost by discarding the recorded data.

United States patent application publication US 2003/0200014 A1 discusses the need for different alarm thresholds depending on the operating parameters of the monitored device. A similar observation is made regarding wind turbines in Orbit 2Q04, p. 21-27.

SUMMARY OF THE INVENTION

It is thus an object of present invention to provide a method of condition monitoring of a wind turbine that avoids the loss of input data that might be used for valid condition monitoring even where temporary time intervals of unstable input data occur, and a wind turbine condition monitoring system therefore.

This object is achieved by the subject-matter of the claims.

The invention according to claim 1 is a method of condition monitoring of a wind turbine, comprising the steps of:
capturing measurement data to be evaluated and operating condition parameters;
selecting a subset of operating condition parameters from the captured operating condition parameters;
calculating a set of n characterizing moments based on the selected subset of operating condition parameters;
providing a finite n-dimensional space each of the n dimensions representing possible values for one of the characterising moments the n-dimensional space being subdivided into a number of bins, where each bin represents a n-dimensional interval defined by n one-dimensional intervals each of the n one-dimensional intervals representing an interval in one of the n dimensions, and where each bin defines an acceptable range for the set of n characterizing moments;
determining if the set of calculated characterising moments belongs to one of the bins;
accepting the set of characterising moments and (typically processed) measurement data if it is detected that the set of characterising moments belongs to one of the bins. Moreover, at least one index for each bin may be provided and the captured measurement data and characterising moments may be tagged with the index, or indices, of the bin to which the set of accepted characterising moments belongs.

By calculating characterizing moments of the subset of operating condition parameters and by then determining if the calculated characterizing moments match any one of the bins (that is, one single of the bins), it is established that even when operating parameters undergo rapid changes, data captured from the various sensors can still be used as long as they can be correlated with the characterizing moments and therefore assigned to their respective bin. In this way, discarding of captured data that might have been used for condition monitoring is avoided, and all data that match the correct bin are indeed used for condition monitoring with the present method.

Another technical effect of this is that the captured measurement data do not necessarily have to correlate in time but can origin from different times of measuring. With the present method (and system), it is merely required that the characterising moments associated to the captured measurement data match the same bin.

Thus, the present method enables to use any valid set of captured measurement data, which can be selected from a continuous capturing of measurement data. As soon as the set of captured measurement data values matches (any) one single of the bins, the data can be used for further evaluation and generation of alarms. Discarding of valuable data becomes unnecessary.

The invention can be embodied as provided in the claims referring back to claim 1 and/or as given in the detailed embodiment.

For example, in case it is determined that the characterizing moments do not belong to one of the bins, the step of determining if the set of calculated characterising moments belongs to one of the bins may be performed again at a later point of time, i.e. with characterizing moments which are based on a later selected subset of operating condition parameters. Thus, it is established that monitoring is always based on a sound data set, and that the system automatically retries obtaining a proper data set in case of temporary lack of valid data.

Additionally or alternatively, in case it is determined that the characterizing moments do belong to one of the bins, it is determined whether measurement data which has undergone one or more processing steps (called processed measurement data in the following) and characterising moments are to be stored in a long-term storage. The step of determining whether the processed measurement data and characterising moments are to be stored in a long-terms storage may comprise a step of detecting whether an alarm status has changed with respect to the alarm status of the processed measurement data and characterising moments contained in the long-term storage and the step of storing the processed measurement data and characterising moments in the long-term storage if it is detected that the alarm status has changed. Additionally or alternatively, step of determining whether the processed measurement data and characterising moments are to be stored in a long-term storage may comprise the step of determining whether a given time has passed since the last storing of processed measurement data and characterising moments in the long-term storage and the step of storing the processed measurement data and characterising moments in the long-term storage if it is detected that the given time has passed. The step of determining whether a given time has passed since the last storing of processed measurement data and characterising moments in the long-term storage is, in a special embodiment, only performed if it is detected that the alarm status of the processed measurement data and characterising moments has not changed with respect to the alarm status of the processed measurement data and characterising moments contained in the long-term storage. Thus it is established that the stored association of processed measurement data to bins is always up-to-date.

Embodiments may also be characterized in that measurement data and operating condition parameters are continuously captured (obtained and recorded). By such continuous capturing, that may be performed in parallel with the remaining steps of the method so as to run in the background, there is always a sufficient amount of current data available.

In embodiments, the set of input captured measurement data and operating condition parameters may comprise measurement data from a condition monitoring system and/or a vibration measurement value and/or a strain gauge measurement value and/or a wind speed measurement value and/or a rotor rotational speed value and/or a generated power value and/or a temperature measurement value and/or a measurement value representative of the amount of metal particles detected in the lubricating oil of the wind turbine.

In embodiments, an evaluation method for the captured measurement data and operating condition parameters can be selected based on evaluating a rule definition. In such embodiments, a rule definition repository may contain at least one rule expression and the rule expression may define the type of evaluation method and/or the time of evaluating the captured measurement data and/or the frequency of evaluating the captured measurement data and/or the type of data to be used for evaluating the captured measurement data and/or the amount of data to be used for evaluating the captured measurement data. Thus, the behaviour of the wind turbine condition monitoring system can be easily adjusted to facilitate different factory settings for different product lines, system parameterization during the initial installing of the wind turbine, or maintenance during the lifetime of the installed wind turbine.

In embodiments, calculating a characterizing moment can comprise calculating a root mean square and/or a mean value of the selected subset of operating condition parameters.

In embodiments of the method, evaluating the captured measurement data may comprises the steps of processing the captured measurement data and comparing the processed measurement data to a predetermined threshold for the bin the set of calculated characterising moments associated to the processed measurement data belongs to.

Embodiments may further be characterized in that evaluating the captured measurement data comprises processing the captured measurement data and comparing the processed measurement data with previously processed measurement data associated to characterising moments which belong to the same bin.

The invention according to claim 14 teaches a wind turbine monitoring system for the method of condition monitoring of a wind turbine according to any one of claims 1 to 14, comprising a memory or buffer and a processing unit, characterized in that the memory or buffer comprises captured and processed measurement data and captured operating parameters, and a number of bins; and the processing unit is configured to carry out the method steps of the method according to any one of claims 1 to 14.

As the person skilled in the art will acknowledge, the wind turbine monitoring system can be embodied by having the processing unit be configured to execute any of the method steps specified in the claims referring back to claim 1 and/or as specified in the detailed description. The processing unit may be configured to execute any of the method steps by appropriate programming, or any combination of specific hardware and/or general-purpose processors and/or application specific integrated circuits and/or software.

BRIEF DESCRIPTION OF THE DRAWINGS

The invention will be described in more detail below, referring to the following figures.

DETAILED DESCRIPTION OF THE INVENTION

Figure 1:
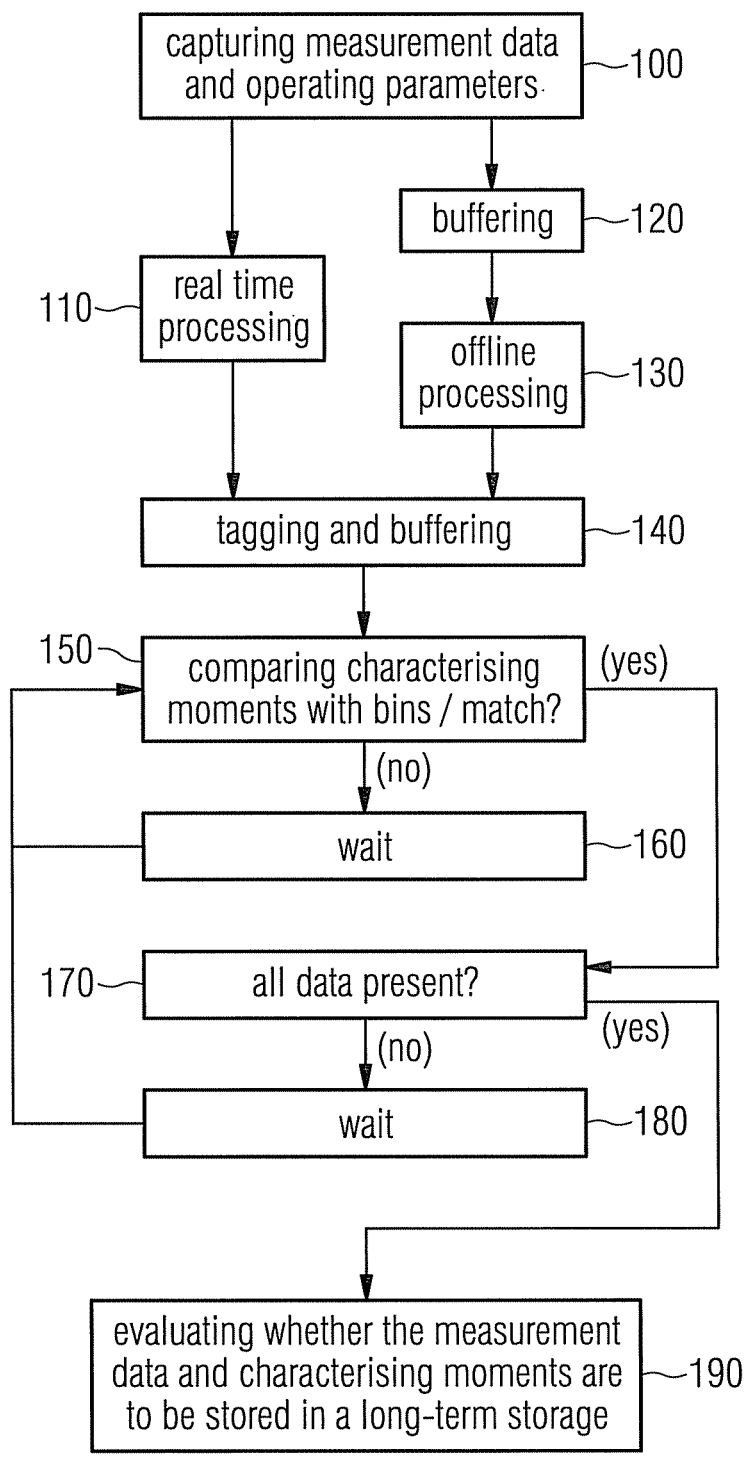
FIG. 1 shows a schematic overview of a first part of an embodiment of the method.

FIG. 1 shows a schematic overview of a first part of an embodiment of the method of present invention. The first part deals with evaluating captured measurement data.

In step 100, the processing unit of a wind turbine control system continuously captures measurement data to be evaluated and operating condition parameters. These captured measurement data to be evaluated and operating condition parameters may comprise data output from the condition monitor sensors, from meteorological sensors, as well as operating parameters of the wind turbine. The parameters thus measured may, e.g., include the rotating speed of the wind turbine, the power generated by the wind turbine, the wind speed, the temperature of various parts of the wind turbine, vibration data from sensors placed on various parts of the wind turbine, and/or the number of metallic particles detected in the lubricating oil in the wind turbine. As the person skilled in the art will understand, the measurement data to be evaluated and operating condition parameters given herein are referred to by example only, and further kinds of measurement data and operating condition parameters may be used with the present invention as well.

The signals containing measurement data to be evaluated and operating condition parameters are captured from various sources. Some signals are captured from sources that are strictly synchronous at high data rates (RPM sampling up to 100 MHz, dynamic signals at 41 kHz, etc.). Other signals are captured from external sources and are tagged with time at the origin. In this case the tagging is synchronised with the wind turbine condition monitoring system. Capturing measurement data is a real-time process that may involve some degree of ring buffering.

The captured measurement data to be evaluated and operating condition parameters are either processed in real-time (Step 110) or stored in a memory or a buffer (Step 120) for subsequent offline processing (step 130). Real-time in the sense of the invention means "without loss of data" rather than "guaranteed response time". Examples for real-time processing of captured signals are pulse-counting on oil-debris monitoring equipment, safety critical monitoring of general vibration levels, tower sway detection, over speed detection, etc. Offline processing is used for more sophisticated analysis of captured measurement data, i.e. analysis that is computationally more demanding than the real-time processing and leads, e.g., to autospectra, time series, envelopes, etc. It can take up to one hour to process buffered measurement data.

Real-time processing as well as offline processing can lead to specific moments and/or analysis results. Specific moments are calculated from a subset of the captured operating condition parameters which describes the operational state of the turbine. The calculated specific moments allow for characterising the operating condition of the wind turbine. Hence, the specific moments are referred to as characterizing moments in the entirety of the present document. These characterizing moments may, e.g., be a mean value or a root mean square of the parameter values in the subset of operating condition parameters.

Real-time processing results and offline processing results are tagged with the time of their original capture and stored in buffers that comprise memory depths measured in hours in step 140. Buffering is done to account for possible processing and communication delays.

Actual processing schedules for real-time and offline processing, i.e. certain evaluation methods that are prioritised to apply to measurement data captured in a specified time interval, are selected by the processing unit. Note, that the specified time interval during which the measurement data was captured must match the time interval during which the operating condition parameters for calculating the characterizing moments were captured. Selecting the processing schedules can be implemented by the processing unit activating a certain prespecified data evaluation method, or by selecting a data evaluation method from a number of data evaluation methods implemented in the processing unit. The selection may be implemented based on a rule definition repository in the memory of the wind turbine monitoring system, the rule definition repository comprising a set of predetermined rules which define when and how often a given method is to be applied. In this way, the method and system are enabled to apply different evaluation methods at different times and for different time intervals of captured input measurement values. Thus, the processing unit may evaluate the rule definition repository to select a data evaluation method according to the rule definition comprised therein.

Capturing of measurement data to be evaluated and operating condition parameters, real-time processing and offline processing, takes place in parallel with all of the remaining method steps that will be described, so that while the processing unit carries out the further steps as described in the following, measurement data to be evaluated and operating condition parameters are continuously captured and processed in the background.

The characterizing moments span a finite n-dimensional space, with one dimension for each of the specific moments discussed above. This n-dimensional space is divided into n-dimensional intervals called bins, where each dimension of an interval represents the range of an acceptable value for one of the characterizing moments.

In step 150, the processing unit compares the characterizing moments with a number of bins stored in the memory of the wind turbine monitoring system according to time tags and determines if the respective calculated characterizing moments fall into one of the bins. If the characterizing moments fall into one of the bins, they are recognised as being within acceptable ranges. This process runs in parallel to capture and processing (steps 100 to 140) and also cleans the buffer or buffers used in step 140 for buffering the real-time processing results and the offline processing results, i.e. the characterising moments and the analysis results.

In case the characterizing moments do not fall into one of the bins, a wait state is executed in step 160. After a certain waiting time has passed, the system returns to step 150 (compare actual characterizing moments with bins). If, on the other hand, the characterizing moments fall into one of the bins, the captured measurement data is accepted by the system and the processing unit proceeds to step 170.

Since evaluating the captured measurement data requires an amount of data that is specific to the selected data evaluation method, and further requires data captured over the time interval specified for the selected data evaluation method, the processing unit determines in step 170 if the required input values are available. If the required input variables are not available, a wait state is executed in step 180. Then, after a certain waiting time has passed, the system returns to step 150 (compare actual characterizing moments with bins).

If the required input variables are available, the processing unit proceeds to step 190 evaluate as to whether the processed measurement data and characterising moments are to be stored in a long-term storage. This evaluation can, e.g., involve comparing the processed measurement data with predetermined thresholds for the bin that the data belongs to, i.e. the bin the characterizing moments which are associated with the measurement data falls into. In embodiments, evaluation may alternatively or at the same time involve comparing the processed measurement data with processed measurement data captured at an earlier point of time and which belongs to the same bin (trending). The result of such evaluation can be the generation of alarms, as a result of which the condition monitoring system applying the present method may enter an alarm status corresponding to the generated alarm. The processed measurement data and characterising moments can be stored in the long-term storage if the evaluation shows a change in an alarm state, or if a given time has lapsed since the last storing of processed measurement data and characterising moments.

Figure 2:
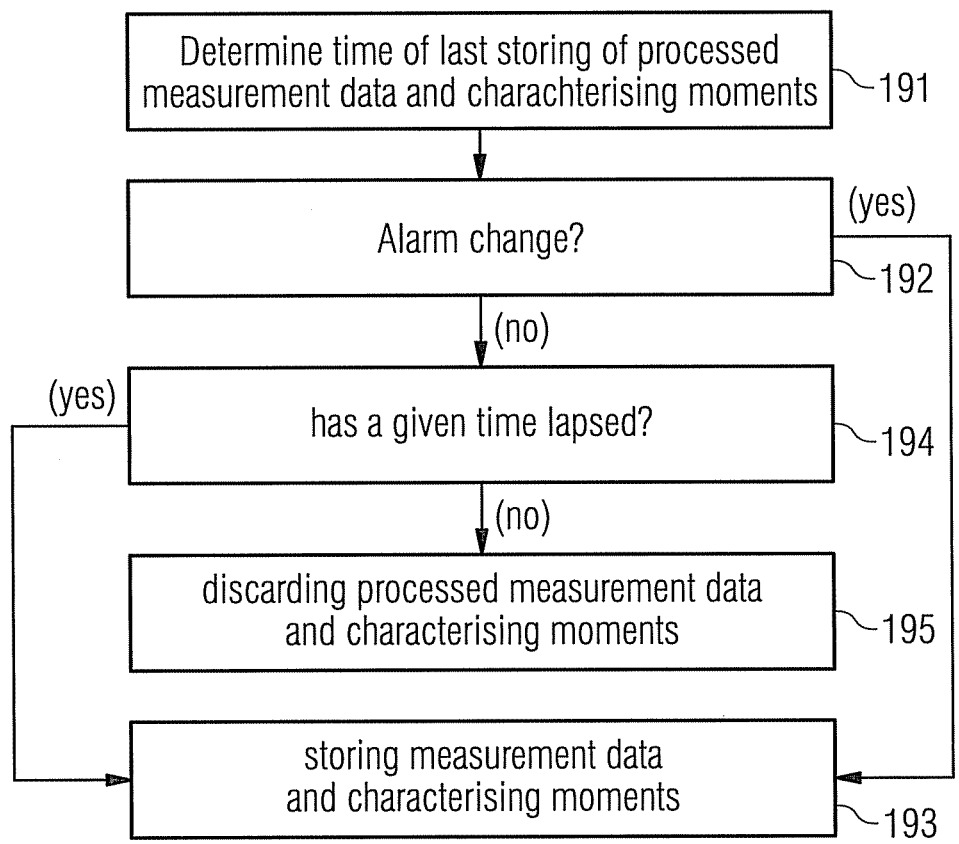
FIG. 2 shows a schematic overview of the second part of the embodiment of the method.

FIG. 2 shows a schematic overview of the evaluation as to whether the processed measurement data and characterising moments are to be stored in a long-term storage. Hence, the FIG. 2 deals with handling and storing the processed measurement data and characterising moments after evaluating to which bin these data belong to.

In step 191, the processing unit determines the point of time at which processed measurement data and characterising moments served as the basis for an evaluation has been stored for the last time.

In step 192, the processing unit determines if a change of the alarm status has occurred between the actual measurement data and characterising moments and the last data storing, as determined in step 191. If such a change of alarm status has occurred, the method is continued in step 193 in which the processed measurement data and characterising moments is stored in the long term storage.

If no change in the alarm status has occurred since the time of last storing, method execution is continued in step 194, in which the processing unit determines if a given time has lapsed since the last storing of processed measurement data and characterising moments. If the given time has lapsed, the method continues to step 193, in which the processed measurement data and characterising moments is stored in the long term storage. If no change in the alarm status has occurred and the given time has not lapsed since the last storing, the processed measurement data and characterising moments can be discarded in step 195.

Figure 3:
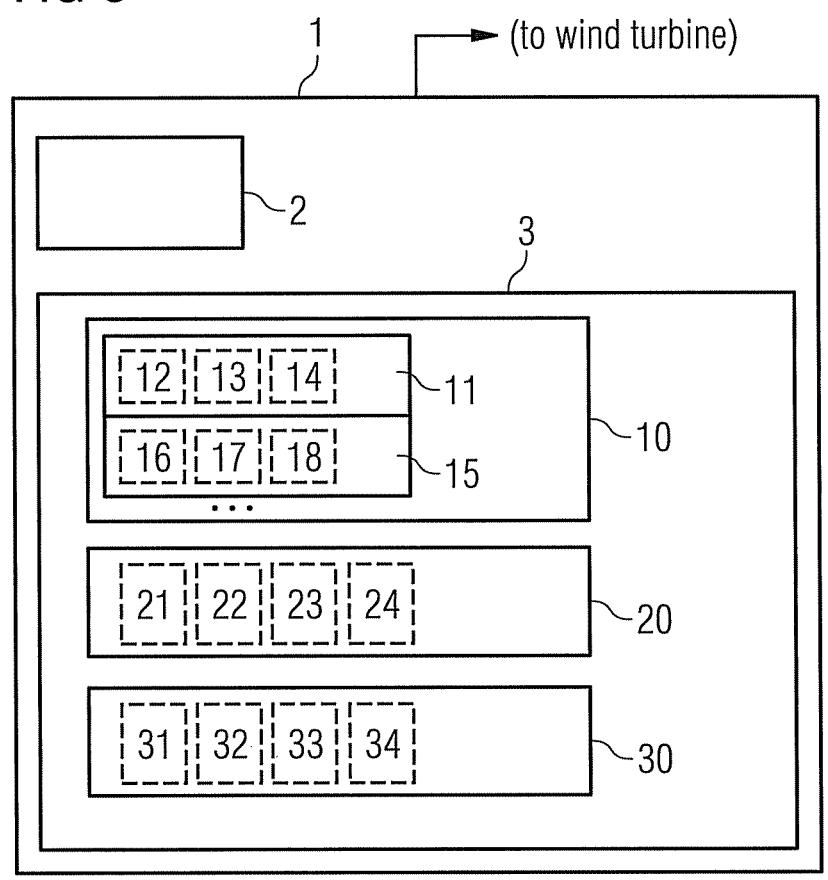
FIG. 3 shows a schematic overview of an embodiment of the wind turbine condition monitoring system.

FIG. 3 provides a schematic overview of a wind turbine condition monitoring system for use with the embodiment of the method described above. Wind turbine condition monitoring system 1 comprises a processing unit 2 and a memory or buffer 3. As indicated by the arrow, the wind turbine condition monitoring system can be coupled to a wind turbine, or a wind turbine control system, for obtaining the input values required by the condition monitoring system and further for outputting data or commands generated by the condition monitoring system.

Memory 3 comprises a rule definition repository 10, in which a number of rules 11, 15 are defined. Rule definition 11 comprises a definition of an evaluation method 12 with a point of time 13 that is associated to the defined evaluation method 12 to define when the evaluation method is to be applied and further comprises an interval definition 14 which specifies the time interval of input data required for data evaluation.

Likewise, rule definition 15 comprises a definition for an evaluation method 16 and an associated point of time for execution 17 and further an associated interval of measurement data for use with the evaluation method as defined in 16. Note that the number of rules shown in FIG. 3 is only an exemplary description and that the number of rules may, in reality, be larger than two.

Memory 3 also comprises a storage area 20 for measurement data to be evaluated 21, 22, and operating condition parameters 23, 24. Note that the number of measurement data to be evaluated shown in FIG. 3 and the number of operating condition parameters shown in FIG. 3 are only an exemplary description and that the number of measurement data to be evaluated and the number of operating condition parameters may, in reality, be much larger.

Further, memory 3 comprises a bin definition repository 30, in which bins 31, 32, 33, and 34 are defined. Each of these bins is a range of acceptable values of the characterizing moments, which is given as an interval of an n-dimensional space. Note that the number of bins shown in FIG. 3 is an exemplary description only and that the number of bins may, in reality, be larger or smaller.

The present method and system allows to use the maximum possible amount of captured input data and reduces the amount of discarded data to a minimum. In particular, there is no discarding of valid data due to rapid changes of operating parameters during capturing of the data. In the present method and system, data captured from the various sensors can still be used as long as they can be correlated with the characterizing moments and therefore assigned to their correct bin. The approach proposed herein also implies that measurements do not necessarily have to be performed simultaneously in order to be evaluated, or compared to each other. It is just necessary that the measurements, that are the captured input values, are assigned to the same bin.

By correlating all data measured (captured input values, for instance obtained from a condition monitoring system) with a set of values that characterizes the operational state of the turbine (characterizing moments), changes in the measured data that are caused by changes in the operational state of the wind turbine can be separated from changes which are caused by changes in the general condition of the wind turbine, such as technical faults or wear of the wind turbine.

Thus, the present method and system further enables to detect slow, long-term changes in the condition of the turbine by trending. At the same time, the rate of false alarms is kept low while also the risk of missing detection is kept to a minimum.

The invention claimed is:

1. A method for monitoring an operating condition of a wind turbine, comprising:
 capturing measurement data and operating condition parameters by various sensors and recording in memory;
 assigning the captured measurement data to a correct one of a plurality of bins by:
  selecting a subset of the operating condition parameters by a processing unit;
  calculating a set of n characterizing moments based on the selected subset of the operating condition parameters by the processing unit, wherein the n characterizing moments comprise a set of values that characterize operational states of the turbine;
  defining a finite n-dimensional space, each of the n-dimensional space representing possible values for one of the n characterising moments by the processing unit;
  sub-dividing the n-dimensional space into the plurality of bins by the processing unit, each of the bins representing a n-dimensional interval and defining an acceptable range for the set of the n characterizing moments that characterize operational states of the turbine;
  defining the n-dimensional interval by n one-dimensional intervals by the processing unit, each of the n one-dimensional intervals representing an interval in one of the n-dimensional space;
  determining if the set of the characterising moments falls within the acceptable range for one of the bins by the processing unit;
  accepting the set of the characterising moments and the captured measurement data if the set of the characterising moments belongs to the one of the bins by the processing unit;
  assigning the captured measurement data to the correct one of the bins based on the acceptable range determination to correlate the captured measurement data with the operational state of the turbine represented by that bin; and
 determining if required input values are available for a selected evaluation method from the captured measurement data and evaluating the captured measurement data correlated with operational state of the turbine by bin according to the selected evaluation method.

2. The method as claimed in claim 1, wherein if the set of the characterizing moments does belong to the one of the bins, processed data of the captured measurement data and the set of the characterising moments are determined whether to be stored in a long-term storage.

3. The method as claimed in claim 2, wherein an alarm status is detected for checking whether the alarm status has changed with respect to the processed measurement data and characterising moments contained in the long-term storage and the processed measurement data and characterising moments are to be stored in the long-term storage if the alarm status has changed.

4. The method as claimed in claim 3, wherein a given time is determined for checking whether the given time has passed since a last storing of the processed measurement data and characterising moments in the long-term storage and the processed measurement data and characterising moments are to be stored in the long-term storage if the given time has passed.

5. The method as claimed in claim 4, wherein the given time is determined for checking whether the given time has passed since the last storing of processed measurement data in the long-term storage only when the alarm status has not changed.

6. The method as claimed in claim 1, wherein the captured measurement data and the operating condition parameters are evaluated based on evaluating a rule definition.

7. The method as claimed in claim 6, wherein the rule definition comprises a rule expression defining a type of an evaluation method, a time of evaluating the measurement data, a frequency of evaluating the measurement data, a type of data to be used for evaluating the measurement data, and an amount of data to be used for evaluating the measurement data.

8. The method as claimed in claim 1, wherein an index of the one of the bins is provided and an evaluation of the captured measurement data is tagged with the index of the one of the bins to which the set of the characterising moments belongs.

9. The method as claimed in claim 1, wherein if the set of the characterizing moments does not belong to the one of the bins, the set of the characterising moments is determined again.

10. The method as claimed in claim 1, wherein the captured measurement data and the operating condition parameters are continuously captured.

11. The method as claimed in claim 1, wherein the captured measurement data and the operating condition parameters comprise measurement data captured from a condition monitoring system, a vibration measurement value, a strain gauge measurement value, a wind speed measurement value, a rotor rotational speed value, a generated power value, a temperature measurement value, and a measurement value representative of an amount of metal particles detected in a lubricating oil of the wind turbine.

12. The method as claimed in claim 1, wherein the characterizing moments are calculated by calculating a root mean square or a mean value of the operating condition parameters.

13. The method as claimed in claim 1, wherein the measurement data is evaluated by processing the captured measurement data and comparing the processed captured measurement data with previously processed captured measurement data associated to the set of the characterising moments which belongs to the same bin.

14. The method as claimed in claim 1, wherein the captured measurement data is processed in real time for pulse-counting on oil-debris monitoring equipment, safety critical monitor of general vibration level, tower sway detection, and over speed detection.

15. The method as claimed in claim 1, wherein the captured measurement data is stored in a memory and is subsequently processed offline for autospectra, time series, and envelopes.

16. A wind turbine monitoring system for monitoring an operating condition of a wind turbine, comprising:
 a memory that comprises captured measurement data and operating condition parameters and a plurality of bins; and
 a processing unit that:
  selects a subset of the operating condition parameters;
  calculates a set of n characterizing moments based on the selected subset of the operating condition parameters, wherein the n characterizing moments comprise a set of values that characterize operational states of the turbine;
  defines a finite n-dimensional space, each of the n-dimensional space representing a possible value for one of the n characterising moments;
  sub-divides the n-dimensional space into the plurality of bins, each of the bins representing a n-dimensional interval and defining an acceptable range for the set of the n characterizing moments that characterize operational states of the turbine;
  defines the n-dimensional interval by n one-dimensional intervals, each of the n one-dimensional intervals representing an interval in one of the n-dimensional space;
  determines if the set of the characterising moments falls within the acceptable range for one of the bins;
  accepts the set of the characterising moments and the captured measurement data if the set of the characterising moments belongs to the one of the bins;
  assigns the captured measurement data to a correct one of the bins based on the acceptable range determination in order to correlate the captured measurement data with operational state of the turbine represented by that bin; and
  determines if required input values are available for a selected evaluation method from the captured measurement data and evaluates the captured measurement data correlated with operational state of the turbine by bin according to the selected evaluation method.

* * * * *